(12) United States Patent
Moeller et al.

(10) Patent No.: US 8,998,046 B2
(45) Date of Patent: Apr. 7, 2015

(54) ROOF RACK WITH AN INDICATION DEVICE FOR A LOAD CARRIER FOOT

(75) Inventors: Mattias Moeller, Bankeryd (SE);
Micael Svensson, Varnamo (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 13/978,468

(22) PCT Filed: Feb. 24, 2012

(86) PCT No.: PCT/EP2012/053195
§ 371 (c)(1),
(2), (4) Date: Jan. 7, 2014

(87) PCT Pub. No.: WO2012/113925
PCT Pub. Date: Aug. 30, 2012

(65) Prior Publication Data
US 2014/0144957 A1   May 29, 2014

(30) Foreign Application Priority Data
Feb. 25, 2011   (EP) .................................... 11156025

(51) Int. Cl.
*B60R 9/045*   (2006.01)
*B60R 9/058*   (2006.01)
*B60R 9/052*   (2006.01)

(52) U.S. Cl.
CPC ........... *B60R 9/058* (2013.01); *Y10T 29/49826* (2015.01); *B60R 9/045* (2013.01); *B60R 9/052* (2013.01)

(58) Field of Classification Search
CPC ................................ B60R 9/048; B60R 9/058
USPC .......................................... 224/319–321, 325
See application file for complete search history.

(56) References Cited

U.S. PATENT DOCUMENTS

| 4,778,092 A | 10/1988 | Grace |
| 5,829,654 A * | 11/1998 | Weger et al. ................. 224/322 |

(Continued)

FOREIGN PATENT DOCUMENTS

| DE | 3115311 | 4/1982 |
| EP | 11156025.6 | 2/2011 |
| WO | 99/19168 | 4/1999 |
| WO | 2012/113925 | 8/2012 |

OTHER PUBLICATIONS

Nternational Searching Authority, International Search Report for International Application No. PCT/EP2012/053195, dated Apr. 23, 2012.

(Continued)

*Primary Examiner* — Brian D Nash
*Assistant Examiner* — Corey Skurdal
(74) *Attorney, Agent, or Firm* — Novak Druce Connolly Bove + Quigg LLP

(57) ABSTRACT

The present invention relates to a roof rack (10) for a vehicle (11). The roof rack ( ) comprises a load carrier bar (13), a first and a second load carrier foot (14), wherein at least the first load carrier foot (14) is displaceable with respect to the load carrier bar (13) to enable the roof rack (10) to be attachable to vehicles (12) of different sizes. The roof rack also comprises a readable indication device (30) enabling the determination of different appropriate positions of the load carrying foot (14). The indication device (30) is displaceable between different positions with respect to the load carrier bar (13) and adapted to be read with respect to a reference point on the roof rack (10), enabling repeatable readings at different positions. The present invention also relates to a method for assembling a roof rack. The roof rack is simple in construction yet easy to use for an end user and does not tend to produce air turbulence around the load carrier bar to any significant degree.

18 Claims, 6 Drawing Sheets

(56) References Cited

U.S. PATENT DOCUMENTS

| | | | |
|---|---|---|---|
| 5,845,828 A * | 12/1998 | Settelmayer | 224/321 |
| 5,931,359 A * | 8/1999 | Zona | 224/321 |
| 5,984,155 A * | 11/1999 | Stapleton | 224/321 |
| 6,273,311 B1 * | 8/2001 | Pedrini | 224/321 |
| 6,905,053 B2 * | 6/2005 | Allen | 224/321 |
| 8,393,508 B2 * | 3/2013 | Sautter et al. | 224/325 |

OTHER PUBLICATIONS

European Patent Office, Intention to Grant for European Application No. 11156025.6, dated Apr. 4, 2013.

European Patent Office, Espacenet Bibliographic Data, English Abstract of DE3115311.

* cited by examiner

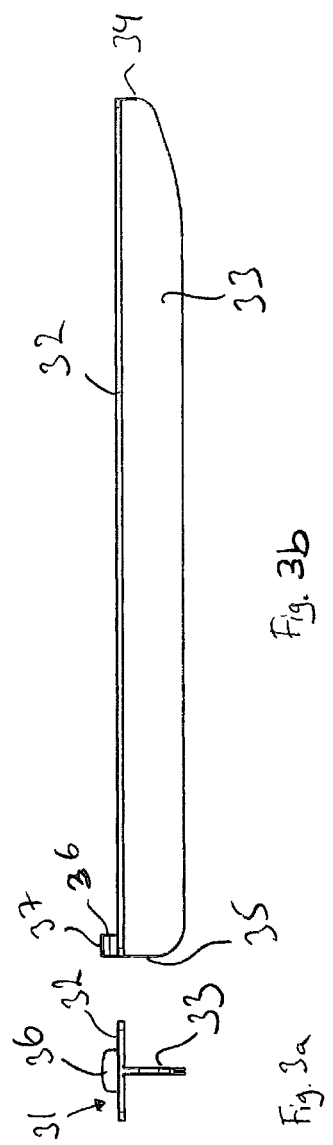

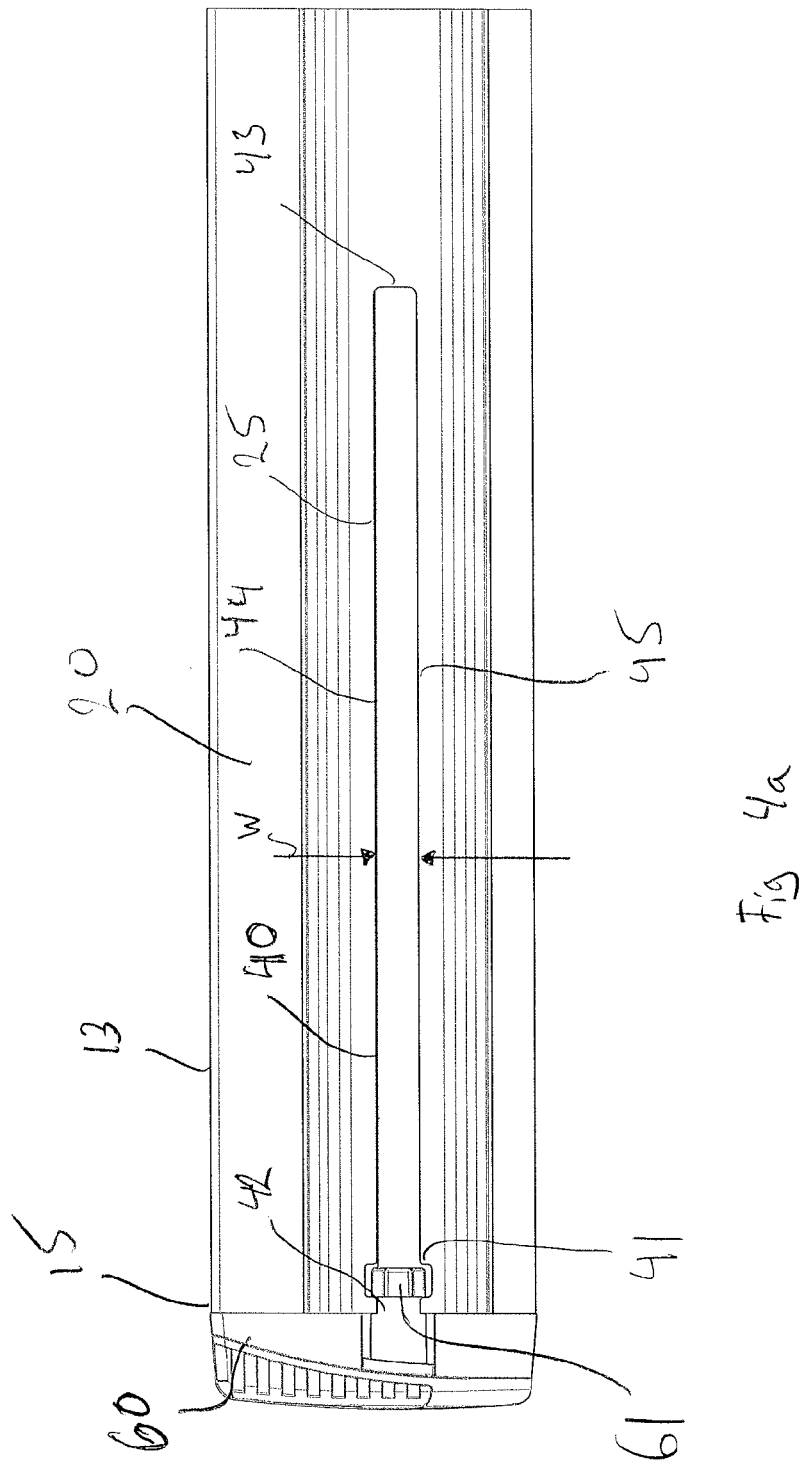

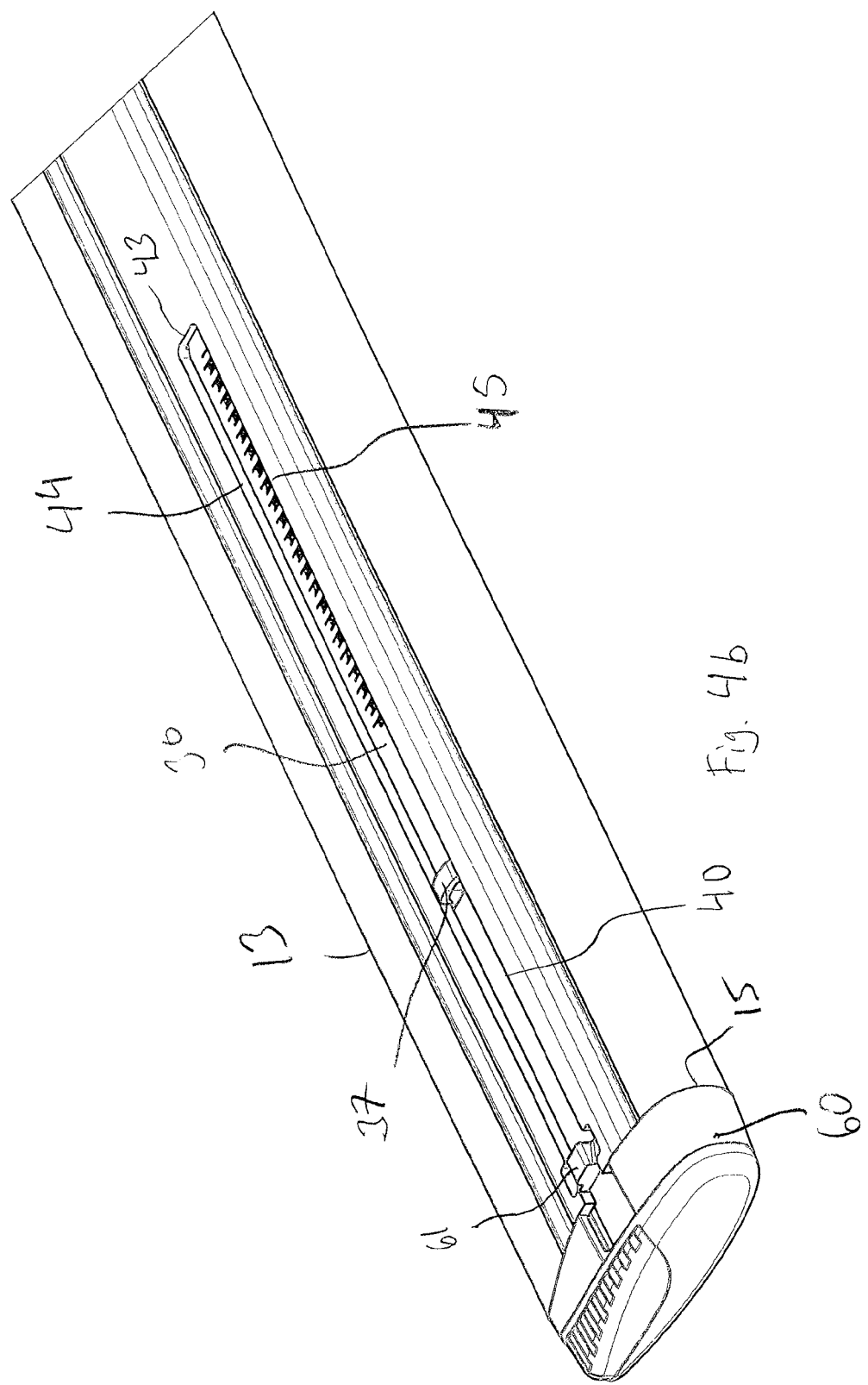

ROOF RACK WITH AN INDICATION DEVICE FOR A LOAD CARRIER FOOT

CROSS-REFERENCE TO RELATED APPLICATION

This application is a national phase application of international application no. PCT/EP2012/053195, which has an international filing date of Feb. 24, 2012, and which claims priority to EP application no. 11156025.6, filed Feb. 25, 2011, both of which applications are entirely incorporated by reference herein.

TECHNICAL FIELD

The present invention relates to a roof rack for a vehicle having a load carrier bar, a first and a second load carrier foot attachable to a surface of the vehicle such as the roof or rails arranged on the roof. At least one load carrier foot is adjustable so that the distance between the first and the second load carrier foot can be adjusted enabling the roof rack to be positioned on vehicles of different sizes.

BACKGROUND OF THE INVENTION

Roof racks for vehicles are widely used for transporting goods and sports equipment such as skies, bags, suitcases, boxes, bicycles, etc. Roof racks generally comprise a load carrier bar extending across the roof, and a first and a second load carrier foot which is attachable to the roof. As there is a wide variety of vehicles on the market, the market requires adjustable roof racks with moveable attachment means so as to be compatible with different sizes and different types of vehicles. Roof racks commonly extend across the roof of the vehicle in the transverse direction perpendicular to the vehicles longitudinal direction. As such it is important that the distance between the first and the second load carrier foot can be adjusted.

One type of adjustable roof rack comprises a load carrier bar with a slot in which the load carrier foot can be releasably attached. The distance between the first and the second load carrier foot can thus be adjusted. One problem with these types of roof racks is that a user who mounts the roof rack to the vehicles roof needs to determine the appropriate length between the load carrier feet and adjust them accordingly during assembly with the vehicle. To simplify this, stickers can be positioned on the load carrier bar or printed e.g. on a plastic cover encompassing the load carrier bar. However, stickers can be wrongly attached and plastic covers can shrink, e.g. due to exposure to UV rays, and as a consequence, the position indication provided by a plastic cover or a sticker can be misleading or directly wrong.

When a vehicle is moving, turbulence can be created around openings, cavities and protruding forms of the load carrier bar. Such turbulence creates noise and also increases the air resistance of the load carrier bar. The solutions mentioned above are also known to increase the air turbulence around the load carrier bar and foot as they generally tend to leave parts of the apertures in which the load carrier foot is attached exposed to the passing air. As air passes the exposed aperture, turbulence is created around the aperture which can impart high levels of noise especially at high speed.

Another solution is a plastic strip which can be cut to a predetermined length. The predetermined length, appropriate for a specific vehicle, can be found in the paper manual for the product or on a corresponding web site on the internet. After the plastic strip has been cut, it is attached in a slot of the load carrier bar and subsequently the load carrier foot can be fastened at the position, in the same slot, which is physically indicated by the length of the pre-cut plastic strip. This solution is not very flexible in terms of enabling repositioning of the load carrier foot. Once the plastic strip has been cut, it offers small or no possibilities to be reattached again. As it requires a tool for cutting, it is not very user friendly.

There is thus a need for an adaptable solution, less sensitive of weather conditions and assembly parameters and which further provides for a simpler handling for the user. The solution should further strive towards low air turbulence to reduce noise.

SUMMARY OF THE INVENTION

It is an object of the present invention to solve, or at least to reduce or to provide a useful alternative to, the above mentioned drawbacks. These objectives are met by a roof rack for a vehicle. The roof rack comprises a load carrier bar with a longitudinal direction, a first and a second load carrier foot, wherein at least the first load carrier foot is displaceable with respect to the load carrier bar in the longitudinal direction of the load carrier bar to enable the roof rack to be attachable to vehicles of different sizes. The roof rack further comprises a readable indication device for enabling the determination of different positions of the load carrying foot. The indication device is displaceable between different positions with respect to the load carrier bar and adapted to be read with respect to a reference point on the roof rack, enabling repeatable readings at different positions.

The present invention provides for a roof rack which is easy to assemble at the manufacturing site or as an end user, and which further is easy to position on the vehicle in an easy manner. The present invention also provides for a versatile roof rack which can be used on many vehicles of different sizes while still permitting a good fit to each vehicle.

According to an aspect of present invention, the reference point is arranged on, or defined by, the load carrier bar. The reference point could be a part of the slot, as disclosed herein, used together with the indication device to determine an appropriate position of the load carrier foot. The reference point could alternatively be a protrusion or any other part of the load carrier bar appropriate to position the load carrier foot.

According to an aspect of the present invention, to readily find the appropriate position of a load carrier foot with respect to the load carrier bar, the indication device is displaceable along the longitudinal direction of the load carrier bar. This enables a slim mechanism which can be fitted inside the load carrier bar and which can be displaced while still not exposing the slot or aperture to passing air, thus keeping air turbulence around the load carrier bar low. Such indication device is advantageously oblong in form so that it can be used with load carrier bars having chambers for improving the rigidity of the load carrier bar.

Hence, according to an aspect of the present invention, the indication device can be arranged at least partly inside of the load carrier bar.

According to an aspect of the present invention the load carrier bar comprises a slot and in the indication device is adapted to be displaceable in, or in the proximity of, the slot so as to be displayed in the slot. This aspect utilizes the slot as a reference point and requires no or little manipulation of the load carrier bar itself except for the slot.

According to an aspect of the invention, the slot of the load carrier bar is an open ended slot arranged at one end of the load carrier bar. This enables an easy insertion of the indication device and the load carrier foot.

According to an aspect of the invention, the indication device and the load carrier foot are both displaceably arranged in the slot. This construction is simple and cost efficient to manufacture.

According to an aspect of the invention, the indication device is displaceable with respect to the first load carrying foot and the load carrier bar.

According to an aspect of the invention, the indication device is a indication rod. The indication rid has an oblong form which can be used with load carrier bars which comprises chambers for increased rigidity. Such load carrier bars can carry more and heavier loads.

According to an aspect of the invention, the indication rod comprises an upper section adapted to be displayed in a slot of the load carrier bar, and a support section adapted to be positioned against a support surface of the load carrier bar. The indication rod is protected inside of the load carrier bar while till sealing any opening of the slot reducing noise due to turbulent air.

To prevent the indication rod from accidental displacement, according to an aspect of the invention, the load carrier bar comprises guiding members to retain the indication rod from displacement in the transverse direction of the load carrier bar while permitting displacement in the longitudinal direction of the load carrier bar. In embodiments where the load carrier bar comprises wall defining different chambers inside of the load carrier bars, such walls could be used as guiding members for the indication rod.

The guiding members can according to an aspect of the invention, be formed by a first and a second flange or a plurality of protrusions extending from the interior surface of the load carrier bar. Optionally the guiding members can be formed by a recess in the wall of the load carrier bar.

The present invention also relates to a method for manufacturing a roof rack. The method comprises the steps of;
providing a load carrier bar;
arranging an indication device to the load carrier bar, advantageously inside of the load carrier bar, so that the indication device after assembly with the load carrier bar can be displaceable between different positions, wherein the different positions can be used to indicate an appropriate position for a load carrier foot. The method also includes the step of providing a load carrier foot which is attachable at the indicated position.

The method enables a roof rack having at least one adjustable load carrier foot to be manufactured in a simple yet effective manner.

The method can also comprise the step of fixing the load carrier foot at the indicated position. The terms "fixing" in this context is intended to mean that the load carrier foot is fixated to the load carrier bar enough for the roof rack to be used with a vehicle to transport an allowable amount of load attached on the load carrier bar.

According to an aspect of the invention, the roof rack is a roof rack according to an embodiment described herein.

It should be noted that even if aspects of the present invention is described with respect to one load carrier foot and one end of the load carrier bar, the roof rack comprises a first and a second load carrier foot and a first and a second end of the load carrier bar. Consequently, one of the load carrier foot or both of them, can be provided with the described feature/features, and consequently, one end of the load carrier bar or both ends, can be provided with the described feature/features.

BRIEF DESCRIPTION OF THE DRAWINGS

The present invention is described in greater detail with reference to the accompanying figures in which;

FIGS. 3a-3b show the indication rod shown in FIG. 2 in different views;

FIG. 4a show parts of the load carrier bar without the indication rod and the load carrier foot from FIGS. 1a and 1b;

FIG. 4b shows parts of the load carrier bar from FIGS. 1a and 1b with the indication rod and before assembly with the load carrier foot and;

DETAILED DESCRIPTION OF PREFERRED EMBODIMENTS

Figure 1:
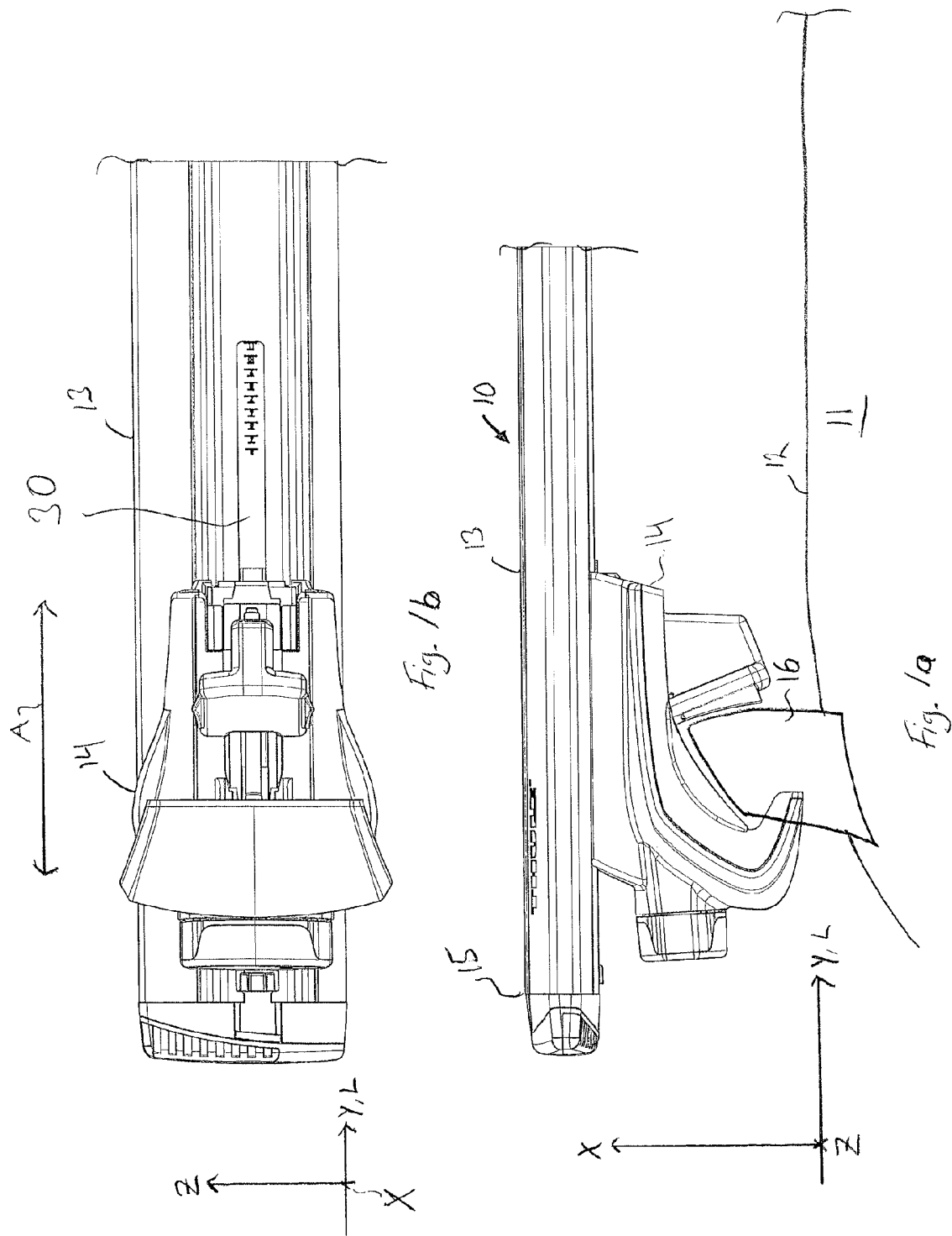
FIG. 1a shows parts of a roof rack with a load carrier bar and a first and a second load carrier foot attached to the rail of the roof of the vehicle, in the shown embodiment a car.
FIG. 1b shows parts of the roof rack from FIG. 1 with a view towards the lower side, or underside, of the roof rack and the load carrier bar.

FIGS. 1a-1b show parts of a roof rack 10 for a vehicle 11 with a roof 12. In this case, the vehicle is a car. The roof rack 10 comprises a load carrier bar 13 and a first load carrier foot 14 mounted in the proximity of the first end 15 of the load carrier bar 13 on a rail 16 of the vehicle 11. A second load carrier foot (not shown) retains the load carrier bar 13 to a second rail (not shown) at the other side of the vehicle 11. The load carrier bar can carry different types of loads such as sports equipment e.g. bicycles, kayaks, skies or the like, travel equipment such as bags, suit cases or the like, or other vehicle accessories such as roof cargo boxes, bicycle racks or the like.

For directional purposes; the load carrier bar 13 has a longitudinal extension L and extends across the roof 12 of the vehicle 11 in the transverse direction of the vehicle 11, visualized by the Y axis in FIGS. 1a-1b. The height of the vehicle 11, the load carrier bar 13, and the load carrier foot 14 is illustrated by the X axis, while the longitudinal direction of the vehicle 11 is illustrated by the Z axis in FIGS. 1a-1b. FIG. 1a shows the roof rack 10 with a view towards the back side of the load carrier bar 13 while FIG. 1b shows the underside of the load carrier bar 13. The X, Y and Z axis are arranged perpendicular to each other.

The position of the first load carrier foot 14 can be adjusted, as indicated by the arrow A, in the longitudinal direction L of the load carrier bar 13, and parallel with the Y axis in FIG. 1a-1b, between different positions. Dependent on the distance between the rails of the vehicle 11, or more generally between two attachment points for the first and the second load carrier foot, the position of at least the first load carrier foot 14 can be adjusted along the longitudinal extension of the load carrier bar 13 to enable the roof rack 10 to be mounted on a variety of vehicles of different sizes. The second load carrier foot can also be adjusted if necessary although for the purpose of the present invention, the position of the first and/or the second load carrier foot can be adjustable.

The roof rack 10 comprises an indication device 30. The indication device 30 is displaceably arranged on the roof rack 10, and in the shown embodiment to the load carrier bar 13, enabling the determination of a wide variety of different positions of the load carrier foot 14 with respect to a reference point, as will be described in greater detail herein.

Figure 2:
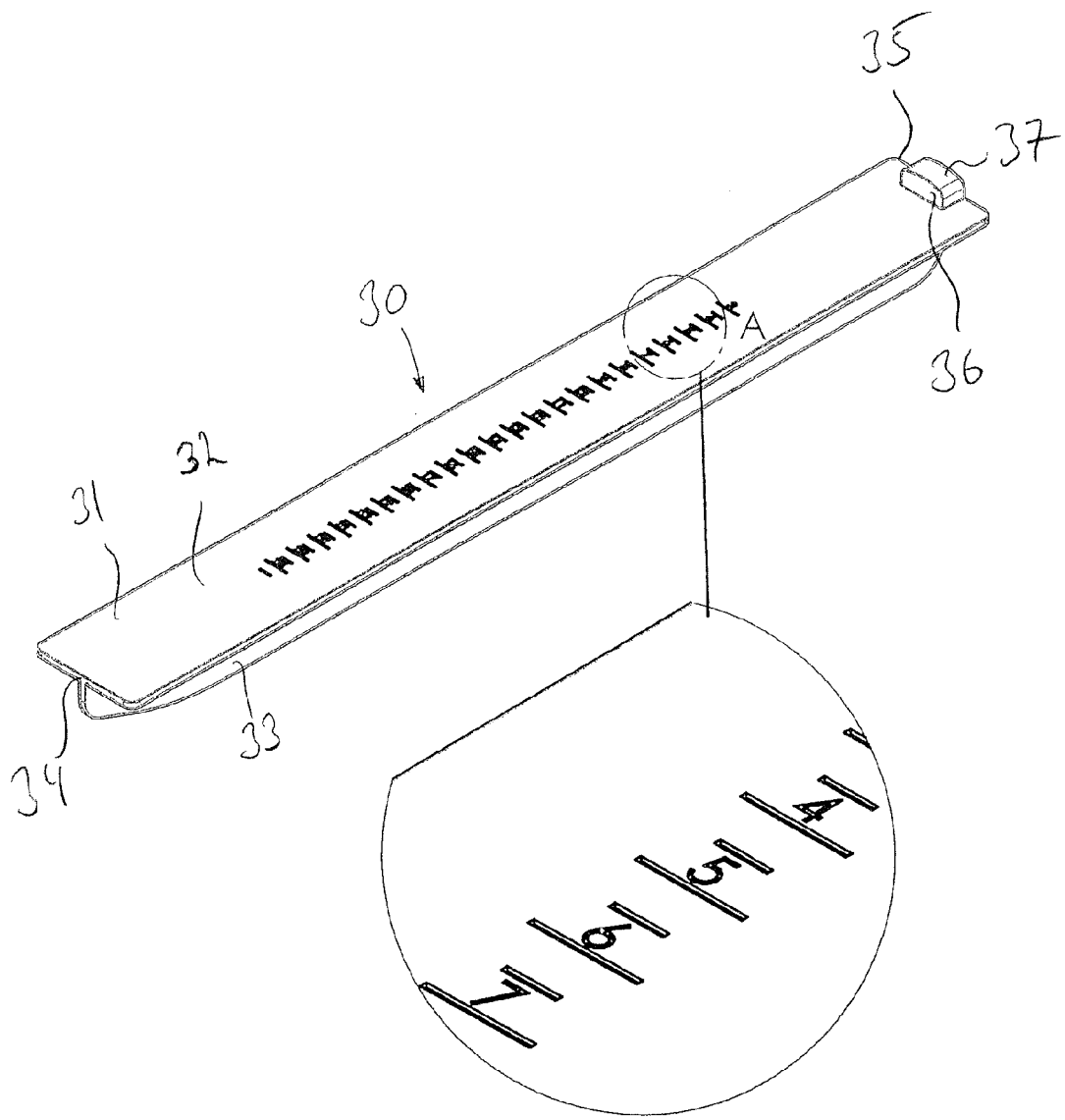
FIG. 2 shows a indication device in the form of a indication rod according to the present invention.

FIG. 2 shows an embodiment of the indication device 30 in the form of an indication rod 31. The indication rod 31 has a longitudinal extension with a T-shaped cross section, also shown in FIG. 3a and FIG. 5. An upper section 32 is substantially perpendicular arranged to a support section 33. As is noticed, the upper section 32 comprises a ruler, or at least a plurality of reference points. In FIG. 2 these reference points are visualized by a metric ruler as shown in the enlarged portion of FIG. 2.

As seen in FIGS. 2-3b, the indication rod 31 comprises a first and a second end 34, 35. The first end 34 of the indication rod 31 is adapted to enable the indication rod 31 to be inserted in an easy and simple manner into the load carrying bar 13. The first end 34 has in the shown embodiment an angled surface to simplify insertion. At the second end 35 of the indication rod 31 a stop surface 36 is arranged. The stop surface 36 is in the form of a protruding flange 37. The stop surface 36 is adapted to cooperate with a surface of the load carrying bar 13 to prevent the indication rod 31 from entering the load carrying bar 13 too far while at the same time providing a grip surface for a user to displace the indication rod 31.

FIG. 3a shows the indication rod 31 as seen towards the first end 34 of the indication rod 31. Visible in FIG. 3a is also the upper section 32, the support section 33 and the stop surface 36 provided by the flange 37. As is further noticed, the upper section 32 and the support section 33 have substantially flat plate like forms. FIG. 3b shows the indication rod 31 as seen towards one of the longitudinal sides of the indication rod 31. Visible in FIG. 3a is also, the upper section 32, the support section 33 and the stop surface 36 provided by the flange 37 extending out from the surface of the upper section 32.

FIGS. 4a-4b show parts of the load carrier bar 13 and more specifically the first end 15 of the load carrier bar 13 with a view towards an underside 20 of the load carrier bar 13. The underside 20 is intended to face the roof 12 of the vehicle 11 after being mounted to the rails 15 of the vehicle 11.

Figure 5:
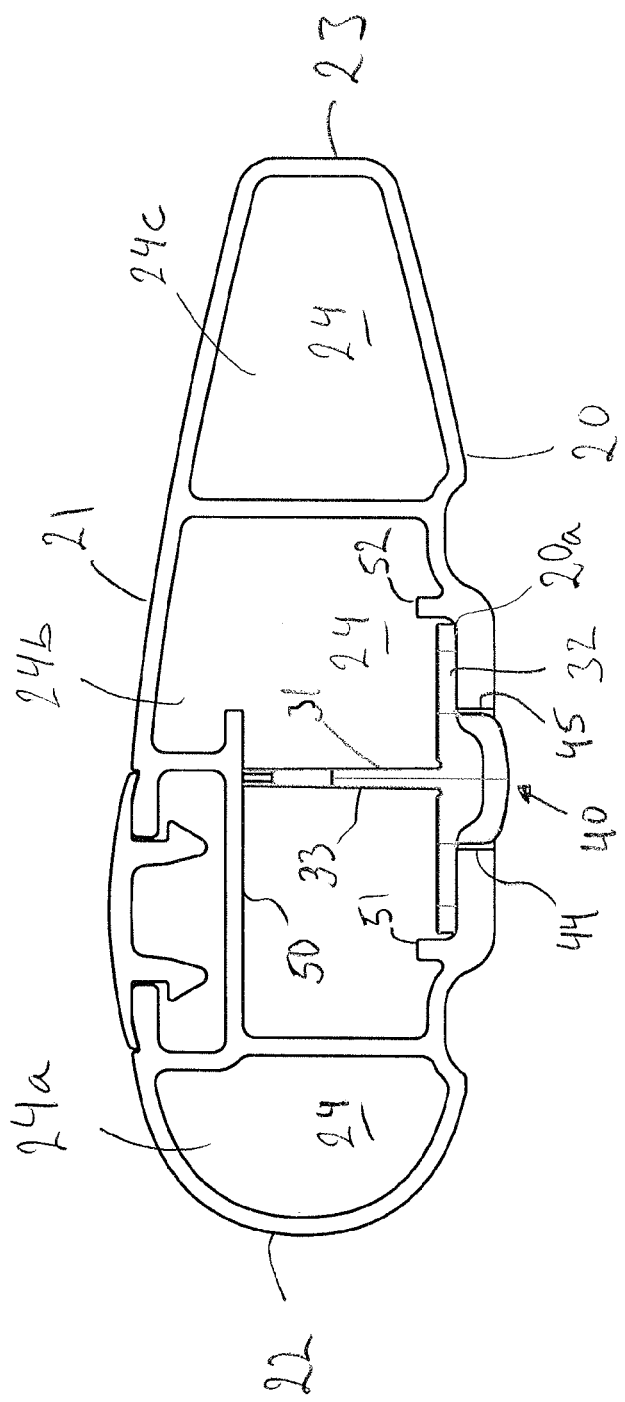
FIG. 5 shows the cross section of the load carrier bar from FIGS. 1a and 1b.

The load carrier bar 13 is manufactured from extruded aluminum with a substantially wing like cross section, as shown in FIG. 5, however it can be manufactured from other materials such as steel, cast iron, carbon reinforced fiber material, plastics or the like, and with another cross section such as an oval cross section, a rectangular cross section, or the like. As is illustrated in FIG. 5, the load carrier bar 13 has an underside 20, an upper side 21, a forward side 22 and a backward side 23. The load carrier bar 13 also has an interior 24, defined by the peripheral wall, i.e. the lower, upper, forward and backward sides 20, 21, 22, 23, of the load carrier bar 13. The interior 24 is separated into different chambers 24a, 24b, 24c which imparts rigidity to the load carrier bar 13.

With reference to FIGS. 4a-4b, the load carrier bar 13 comprises a void for receiving an attachment member of the load carrier foot 14 to attach the load carrier foot 14 to the load carrier bar 13 and adapted to receive the indication device 30 to enable the positioning of the load carrier foot 14 at a predetermined position. The void can be defined by parts of the load carrier bar 13 or by any other part attached thereto. The void is preferably defined by the load carrier bar 13 and more preferably by the interior 24, or parts of the interior 24a, 24b, 24c, and parts of the side walls of the load carrier bar 13. The void can be an aperture, opening or cavity adapted to receive the indication device 30 to enable the positioning of the load carrier foot 14 at a predetermined position.

The indication device 30 enables a user to position the load carrier foot 14 by using the indication device 30 as will be described in greater detail below.

In the shown embodiment, the void is a slot 40 which extends from the first end 15 of the load carrier bar 13 in the longitudinal direction of the load carrier bar 13. The slot 40 is adapted to display the indication device 30 as is illustrated in FIG. 4b, after the indication device 30 has been inserted into the load carrier bar 13 whereafter the first end 15 of the load carrier bar 13 is sealed by an end plug 60 attached at the first end 15 of the load carrier bar 13. The slot 40 is in the shown embodiment open ended, i.e. it is not fully delimited by the wall of the lower side 20 of the load carrier bar 13, and hence the end plug 60 also seals, or in other terms delimits, the slot 40 after assembly with the load carrier bar 13. A cut out 41 in the lower side 20 at the slot 40, in the proximity of the first end 15 of the load carrier bar 13, provides for a lock arrangement 42 together with a flange member 61 of the end plug 60.

The slot 40 has a first end 42. The first end 42 of the slot 40 is open ended as mentioned above, but after assembly with the end plug 60 sealed and defined by the flange member 61 of the end plug 60. A second end 43 of the slot 40 delimits the longitudinal extension of the slot 40 in a direction towards the second end (not shown) of the load carrier bar 13.

The slot 40 is further delimited by a first and a second longitudinal side edge 44, 45 which defines a width W of the slot 40. Instead of the slot 40 an aperture can be used. In such an embodiment, the aperture is fully delimited by the wall of the lower side 20 of the load carrier bar 13.

FIG. 4b shows the indication device 30, in the form of the indication rod 31, after insertion into the interior 24 of the load carrier bar 13 and after the end plug 60 has been mounted to the load carrier bar 13. The flange 37 extends into the slot 40, between the first and the second longitudinal side edges 44, 45 and also prevents the indication rod 31 from being displaced from the slot 40. After insertion, the indication rod 31 can be displaced in the longitudinal direction of the load carrier bar 13 between different positions. Each position can be preset, or pre determined by the reference points on the upper section 32 of the indication rod 31. The indication device 30 thus enables a user to position the load carrier foot 14 by using the indication device 30 as a position indicator directly or indirectly. It can be used directly if the indication device 30 is used to direct indicate the desired position of the load carrier foot 14 or indirectly if it is used to position a second member which in turn is used to directly or indirectly indicate the desired position of the load carrier foot 14. After the indication device 30, or the indication rod 31, as shown in FIG. 4b, has been positioned, the load carrier foot 14 can be fixed to the load carrier bar 13 at the indicated position defined by the indication device 30 or the indication rod 31.

The support section 33 of the indication rod 31 is positioned adjacent a support surface 50 of the load carrier bar 13 as can be seen in FIG. 5. The support surface 50 of the load carrier bar 13 assists the support section 33 of the indication rod 31 to retain the upper section 32 of the indication rod 31 towards an interior surface 20a of the lower side 20 of the load carrier bar 13 and thus be properly displayed in the slot 40. The interior surface 20a of the lower side 20 of the load carrier bar 13 also comprises a first and a second flange 51, 52 which extends in the longitudinal direction of the load carrier bar 13, parallel with the slot 40 of the load carrier bar 13. The indication rod 31 is guided by the first and the second flange 51, 52 of the interior surface 20a of the lower side 20 of the load carrier bar 13 and retained in place with respect to the transverse direction, i.e. the Z axis, as illustrated in FIG. 1b, while being permitted to be displaced in the longitudinal direction L of the load carrier bar 13. As an alternatively to a first and a second flange 51, 52, which extend in the longitudinal direction L of the load carrier bar 13, a plurality of separate flange members, protruding members, or a recess in the wall, can be arranged on the interior surface 20a of the lower side 20 of the load carrier bar 13.

The indication device 30 can have a wide variety of forms. For example, the cross section of the indication rod 31 can be circular, square formed, triangular, or any other polygonal form, other forms are also possible. Other displaceable indication devices are also possible, it is however important that the indication device is adapted to enable repeatable readings at different positions. This enables the indication device to be operable for adapting the distance between a first and a second load carrier foot for different vehicles.

The invention claimed is:

1. A roof rack for a vehicle comprising:
   a load carrier bar having a longitudinal direction;
   a first and a second load carrier foot, wherein at least said first load carrier foot is displaceable with respect to said load carrier bar in said longitudinal direction of said load carrier bar to enable said roof rack to be attachable to vehicles of different sizes; and
   a readable indication rod having at least a plurality of reference marks;
   wherein said load carrier bar comprises a slot along said longitudinal direction of said load carrier bar and said indication rod is configured to be displaceable in said slot between different positions with respect to said load carrier bar enabling the determination of different appropriate positions of said load carrying foot with respect to said longitudinal direction of said load carrier bar;
   said indication rod being configured to be read with respect to a reference point on said roof rack and operable for adapting the distance between a first and a second load carrier foot for different vehicles.

2. The roof rack according to claim 1, wherein said reference point on said roof rack is arranged on said load carrier bar.

3. The roof rack according to claim 1, wherein said reference point on said roof rack is defined by said load carrier bar.

4. The roof rack according to claim 1, wherein said indication rod is arranged at least partly inside of said load carrier bar.

5. The roof rack according to claim 2, wherein said indication rod is arranged at least partly inside of said load carrier bar.

6. The roof rack according to claim 1, wherein said indication rod has an oblong form and said load carrier bar comprises chambers.

7. The roof rack according to claim 2, wherein said indication rod has an oblong form and said load carrier bar comprises chambers.

8. The roof rack according to claim 1, wherein said indication rod comprises an upper section adapted to be displayed in a slot of said load carrier bar, and a support section configured to be positioned against a support surface of said load carrier bar.

9. The roof rack according to claim 8, wherein said slot of said load carrier bar is an open ended slot arranged at one end of said load carrier bar.

10. The roof rack according to claim 8, wherein said indication rod and said load carrier foot are both displaceably arranged in said slot.

11. The roof rack according to claim 9, wherein said indication rod and said load carrier foot are both displaceably arranged in said slot.

12. The roof rack according to claim 1, wherein said indication rod is displaceable with respect to said first load carrying foot and said load carrier bar.

13. The roof rack according to claim 2, wherein said indication rod is displaceable with respect to said first load carrying foot and said load carrier bar.

14. The roof rack according to claim 12, wherein said indication rod comprises an upper section adapted to be displayed in a slot of said load carrier bar, and a support section configured to be positioned against a support surface of said load carrier bar.

15. The roof rack according to claim 12, wherein said load carrier bar comprises guiding members to retain said indication rod from displacement in a transverse direction of the load carrier bar while permitting displacement in said longitudinal direction of said load carrier bar.

16. The roof rack according to claim 14, wherein said load carrier bar comprises guiding members to retain said indication rod from displacement in a transverse direction of the load carrier bar while permitting displacement in said longitudinal direction of said load carrier bar.

17. The roof rack according to claim 15, wherein said guiding members are formed by a first and a second flange.

18. The roof rack according to claim 15, wherein said guiding members are formed by one of a plurality of protrusions and a recess.

* * * * *